United States Patent
Ohmi et al.

(10) Patent No.: US 6,964,279 B2
(45) Date of Patent: Nov. 15, 2005

(54) PRESSURE-TYPE FLOW RATE CONTROL APPARATUS

(75) Inventors: Tadahiro Ohmi, 1-17-301, Komegahukuro 2-chome, Aoba-ku, Sendai-shi, Miyagi (JP) 980-0813; Tomio Uno, Osaka (JP); Osamu Nakamura, Osaka (JP); Nobukazu Ikeda, Osaka (JP); Ryousuke Dohi, Osaka (JP); Kouji Nishino, Osaka (JP); Atsushi Matsumoto, Osaka (JP); Kazuhiko Sugiyama, Minato-ku (JP); Shujiro Inui, Nishinomiya (JP); Taiji Sakai, Suita (JP); Masanori Ueyama, Mino (JP)

(73) Assignees: Fujikin Incorporated, Osaka (JP); Tadahiro Ohmi, Miyagi (JP); Tokyo Electron Ltd., Tokyo (JP)

( * ) Notice: Subject to any disclaimer, the term of this patent is extended or adjusted under 35 U.S.C. 154(b) by 101 days.

(21) Appl. No.: 10/469,151

(22) PCT Filed: Nov. 22, 2002

(86) PCT No.: PCT/JP02/12250
§ 371 (c)(1),
(2), (4) Date: Aug. 27, 2003

(87) PCT Pub. No.: WO03/058363

PCT Pub. Date: Jul. 17, 2003

(65) Prior Publication Data
US 2004/0204794 A1    Oct. 14, 2004

(30) Foreign Application Priority Data
Dec. 28, 2001  (JP) ............... 2001-399433

(51) Int. Cl.⁷ ............ G05D 7/06
(52) U.S. Cl. .......... 137/487.5; 137/486
(58) Field of Search ............ 137/486, 487.5; 700/282; 118/715

(56) References Cited

U.S. PATENT DOCUMENTS 4,222,403 A  *  9/1980 Sonoda .......... 137/183

(Continued)

FOREIGN PATENT DOCUMENTS

JP    9-189586 A2    7/1997

(Continued)

OTHER PUBLICATIONS

International Search Report, PCT/JP02/12250, 6 pages (includes first 2 pages of WO 03/058363 A1).

*Primary Examiner*—Ramesh Krishnamurthy
(74) *Attorney, Agent, or Firm*—Griffin & Szipl, P.C.

(57) ABSTRACT

A pressure-type flow rate control apparatus controls the flow rate of fluid passing through an orifice to a target flow rate. The flow rate of a compressible fluid under non-critical conditions (sub-sonic) passing through the orifice is calculated by:

$$Qc = KP_2^m(P_1 - P_2)^n$$

so that the flow rate can be controlled to the target flow rate with high precision and speed.

Also provided is an improved pressure-type flow rate control apparatus in which a pressure ratio $P_2/P_1 = r$, obtained from an upstream pressure $P_1$ and a downstream pressure $P_2$ is constantly compared with a critical value r, and under critical conditions ($r \leq r_c$), the flow rate is calculated by:

$$Qc = KP_1.$$

Under non-critical conditions ($r > r_c$), the flow rate is calculated by $Qc = KP_2^m(P_1 - P_2)^n$.

6 Claims, 5 Drawing Sheets

U.S. PATENT DOCUMENTS

| | | | |
|---|---|---|---|
| 4,763,681 A | * | 8/1988 | Cuny et al. .................... 137/8 |
| 5,868,159 A | * | 2/1999 | Loan et al. ................. 137/334 |
| 6,510,746 B1 | * | 1/2003 | Kotwicki ................. 73/861.52 |
| 6,539,968 B1 | * | 4/2003 | White et al. .................. 137/10 |

FOREIGN PATENT DOCUMENTS

| | | |
|---|---|---|
| JP | 10-55218 A2 | 2/1998 |
| JP | 2000-122725 A2 | 4/2000 |
| JP | 2001-027556 A2 | 1/2001 |
| JP | 2001-201376 A2 | 7/2001 |

* cited by examiner

PRESSURE-TYPE FLOW RATE CONTROL APPARATUS

This is a National Phase Application in the United States of International Patent Application No. PCT/JP02/12250, filed Nov. 22, 2002, which claims priority on Japanese Patent Application No. 2001-399433, filed Dec. 28, 2001. The entire disclosures of the above patent applications are hereby incorporated by reference.

BACKGROUND OF THE INVENTION

1. Field of the Invention

The present invention relates to a pressure-type flow rate control apparatus for use mainly in semiconductor manufacturing facilities and chemical plants. More specifically, this invention concerns an improved pressure-type flow rate control apparatus in which the flow rate of a fluid which is supplied at sub-sonic speeds is determined accurately using a new empirical formula, and then the flow rate of the fluid to be supplied is controlled accurately on the basis of this empirical formula.

2. Description of the Prior Art

In semiconductor manufacturing facilities, chemical plants, etc., a plurality of gaseous reactants are supplied at respective specific rates and are normally reacted in a reactor to produce an object or target gas. In this process, if the reactant gases are not supplied at accurate flow rates, then the chemical reaction proceeds unevenly, and as a result, unreacted gases remain in the produced object gas.

Reactant gases remaining unreacted become impurity gases and lower the purity of the object gas. Where such an unreacted gas is explosive, there is a particular concern that explosions may occur in subsequent facilities, and accordingly special measures are adopted to remove the explosive unreacted gas.

It is therefore necessary to control accurately the flow rates of gases to be supplied, and a mass flow controller has been used as gas flow rate controller at many plants. However, a mass flow controller has many problems; for instance, 1) a relatively slow response time, 2) poor flow rate accuracy at low flow rates, 3) numerous operational difficulties, and 4) high costs.

For this reason, it has been previously observed that there is a need to improve the accuracy of gas flow rate control by means other than a mass flow controller. In response, the present inventors developed a pressure-type flow rate control apparatus and disclosed the same in unexamined Japanese patent application no. 10-55218. In this pressure-type flow rate control apparatus, fluid is forced through an orifice under critical conditions such that the flow velocity of the fluid is super-sonic.

FIG. 5 is an explanatory diagram of a theoretical formula that has been used hitherto for calculating the flow rate of fluid. Below is discussed a case where a fluid flowing into an orifice through a pipe has an upstream pressure upstream of the orifice which is set at $P_1$, and is supplied to a downstream pipe at a downstream pressure of $P_2$; here the upstream pressure $P_1$ and the downstream pressure $P_2$ are expressed in absolute pressure values.

It is known that the flow rate conditions of the fluid passing the orifice change greatly once the flow velocity of the fluid reaches the speed of sound. Under non-critical (sub-sonic) conditions, before sonic velocity is reached, the downstream flow rate Q is given by:

$$Q=SC(P_2(P_1-P_2))^{1/2}/T^{1/2},$$

but under critical (sonic) conditions, once sonic velocity has been reached, it is found that the formula:

$$Q=SCP_1/T^{1/2}$$

holds good and is applicable;
wherein T is the absolute temperature of the fluid at the time of passing the orifice;
S is the sectional area of the orifice hole;
and C is a proportional coefficient.

It is known in hydrodynamics that the critical conditions at which the velocity of a fluid reaches sonic velocity are expressed by the critical value $r_c$ of pressure ratio $P_2/P_1$. The critical value $r_c$ is given by $P_2/P_1=r_c=(2/(n+1))^{n/(n-1)}$, using the gas specific heat ratio n.

Said specific heat ratio n is given by:
n=Cp/Cv,
where Cp is the specific heat capacity of the fluid at constant pressure,
and Cv is the specific heat capacity of the fluid at constant volume.

In the case of two-atom molecular gases (e.g. $O_2$, $H_2$), n=7/5=1.4, and $r_c$=0.53. In the case of nonlinear, three-atom molecular gases, n=8/6=1.33 and $r_c$=0.54. Thus these values may be expressed as $r_c$=~0.5.

Problems that the Invention is to Solve

With reference to FIG. 5, discussed below is a case where, with the upstream pressure $P_1$ constant and the downstream pressure $P_2$ variable, critical conditions and non-critical conditions are considered. Since critical conditions obtain when $P_2/P_1 \leq r_c(=\sim 0.5)$, the region of the diagram where $P_2 \leq r_c P_1 (\approx 0.5\ P_1)$ constitutes a sonic region. Conversely, where $P_2 > r_c P_1 (\approx 0.5\ P_1)$ is an sub-sonic region (non-critical conditions).

As mentioned above, when the fluid is under non-critical conditions (in the sub-sonic region), the flow rate Qc of the fluid that passes the orifice may be expressed by:

$$Qc=SC(P_2(P_1-P_2))^{1/2}/T^{1/2}.$$

Simplifying this expression:

$$Qc=K(P_2(P^1-P_2))^{1/2},$$

the proportional constant K may be expressed by:

$$K=SC/T^{1/2}.$$

This flow rate formula is derived from Bernoulli's theorem, but Bernoulli's theorem relates to ideal conditions where a fluid is non-compressible. In actual gas flow, however, compression and expansion normally occur, and therefore it is unsurprising that the above-mentioned flow rate formula Qc gives errors when compared with actual flow rates.

When the pressure change of the fluid is small, i.e. where the change in specific weight of the fluid is small, incompressibility of the fluid is approximated. Where a fluid satisfies such ideal conditions, the flow rate of the fluid can be controlled satisfactorily using this flow rate formula. In many cases, however, these fluid conditions fail to be satisfied. As a result, if this flow rate formula is used, the flow rate can not be controlled with great precision.

Accordingly, the inventors previously filed the aforesaid patent application no. 10-55218 in which pressure ratio $P_2/P_1$ is constrained to be smaller than the critical pressure ratio $r_c$ in order to obtain critical conditions, and the flow rate is controlled under such critical conditions. The theoretical flow rate formula is therefore:

$$Qc=KP_1,$$

and the proportional constant K is given by:

$$K=SC/T^{1/2}.$$

Advantageously under these critical conditions, the flow rate Qc does not depend on the downstream fluid conditions, with the result that the flow rate can be controlled with great precision.

However, a prerequisite for attaining such high accuracy in flow rate control is that the critical conditions are realized. If the critical conditions are not obtained, then the use of $Qc=KP_1$ to control the flow rate of a fluid will give rise to considerable errors.

Furthermore, even if $Qc=K_1$ is used as the flow rate formula, the critical conditions are realized as long as the actual flow rate is great, but as the flow rate decreases, the upstream pressure $P_1$ and the downstream pressure $P_2$ converge, and, as a result, the non-critical conditions sometimes occur. In such cases, since the flow rate formula $Qc=KP_1$ no longer holds good, the flow rate control will be substantially inaccurate.

Thus, the prior art pressure-type flow rate control apparatus has two serious shortcomings. Firstly, since the theoretical flow rate formula used under non-critical conditions, is predicated on the basis that the fluid is non-compressible, large errors can arise when it is used to control the flow rate of a compressible fluid under non-critical conditions. Secondly, even when the flow rate formula $Qc=KP_1$, which is applicable under critical conditions, is used, non-critical conditions can occur as the downstream pressure $P_2$ increases. As a result, great errors can arise since the applicable flow rate formula is then no longer formula $Qc=KP_1$, but $Qc=K(P_2(P_1-P_2))^{1/2}$.

SUMMARY OF THE INVENTION

Accordingly, it is a first object of the present invention to provide an empirical formula which is applicable with high precision to the actual flow rate of a compressible fluid under non-critical conditions, and to control the flow rate of a compressible fluid under non-critical conditions with high precision using said flow rate empirical formula.

It is a second object of the present invention to achieve high accuracy control of flow rate across the entire range of flow rates using $Qc=KP_1$ under critical conditions, and using the above-mentioned flow rate empirical formula under non-critical conditions, while always monitoring whether the fluid is under critical or non-critical conditions.

The invention in accordance with a first embodiment is an improved pressure-type flow rate control apparatus, characterized in that when a fluid is passed through an orifice for flow rate control, the fluid flow rate Qc of the fluid passing through the orifice is calculated by the formula:

$$Qc=KP_2{}^m(P_1-P_2)^n$$

(K is a proportional constant; m and n are constants) from the pressure $P_1$ upstream of the orifice and the pressure $P_2$ downstream of the orifice.

The invention in accordance with a second embodiment is an improved pressure-type flow rate control apparatus comprising an orifice for controlling flow rate, a control valve provided on a pipe on an upstream side of said orifice, an upstream pressure sensor provided between said orifice and said control valve to detect an upstream pressure $P_1$, a downstream pressure sensor provided on a pipe on a downstream side of the orifice to detect a downstream pressure $P_2$, flow rate calculating means for calculating a calculated flow rate, Qc, by:

$$Qc=KP_2{}^m(P_1-P_2)^n$$

from said upstream pressure $P_1$ and said downstream pressure $P_2$ (where K is a proportional constant; and m and n are constants), flow rate setting means for selecting a set flow rate, Qs, for fluid to be supplied on said downstream side, subtraction means for determining a flow rate difference, $\Delta Q$, between set flow rate, Qs, and said calculated flow rate, Qc, and a drive unit for controlling (opening and closing) the control valve to adjust the flow rate difference, $\Delta Q$, to zero so that the flow rate of the fluid to be supplied at the downstream side is controlled to be said set flow rate, Qs.

The invention in accordance with a third embodiment is an improved pressure-type flow rate control apparatus according the second embodiment that is permitted to operate under non-critical conditions whereby the velocity of the fluid flowing from said orifice is lower than sonic velocity.

The invention in accordance with a fourth embodiment is an improved pressure-type flow rate control apparatus comprising an orifice for controlling flow rate, a control valve provided on a pipe on an upstream side of said orifice, a pressure sensor on said upstream side provided between the orifice and said control valve for detecting an upstream pressure $P_1$, a downstream pressure sensor provided on a pipe on a downstream side of the orifice for detecting a downstream pressure $P_2$, critical conditions judging means for judging on the basis of the pressure ratio between upstream pressure $P_1$ and said downstream pressure $P_2$ whether fluid flowing out of the orifice is under critical conditions (i.e. super-sonic) or not, non-critical flow rate calculating means for calculating under non-critical conditions a calculated flow rate, Qc, by:

$$Qc=KP_2{}^m(P_1-P_2)^n$$

(K=proportional constant; m and n=constants)
from said upstream pressure $P_1$ and said downstream pressure $P_2$, critical flow rate calculation means for calculating under critical conditions said calculated flow rate, Qc, by:

$$Qc=KP_1$$

(K=proportional constant),
flow rate setting means for selecting a set flow rate, Qs, for fluid to be supplied on said downstream side, subtraction means for determining a flow rate difference, $\Delta Q$, between set flow rate, Qs, and said calculated flow rate, Qc, and a drive unit for controlling a control valve to bring said flow rate difference, $\Delta Q$, to zero so that the flow rate of fluid to be supplied to the downstream side is controlled to be said set flow rate, Qs.

The invention in accordance with a fifth embodiment is an improved pressure-type flow rate control apparatus according to third or fourth embodiments 4, wherein a critical pressure ratio $R_c$ $(=P_2/P_1)$ is calculated according to:

$$r_c=(2/(n+1))^{n/(n-1)}$$

(n is the specific heat ratio of the fluid molecule defined by Cp/Cv),
wherein when pressure ratio $P_2/P_1$ is not higher than the critical pressure ratio, $r_c$, the fluid is judged to be under critical conditions, and when pressure ratio $P_2/P_1$ is higher than critical pressure ratio, $r_c$, the fluid is judged to be under non-critical conditions.

Figure 1:
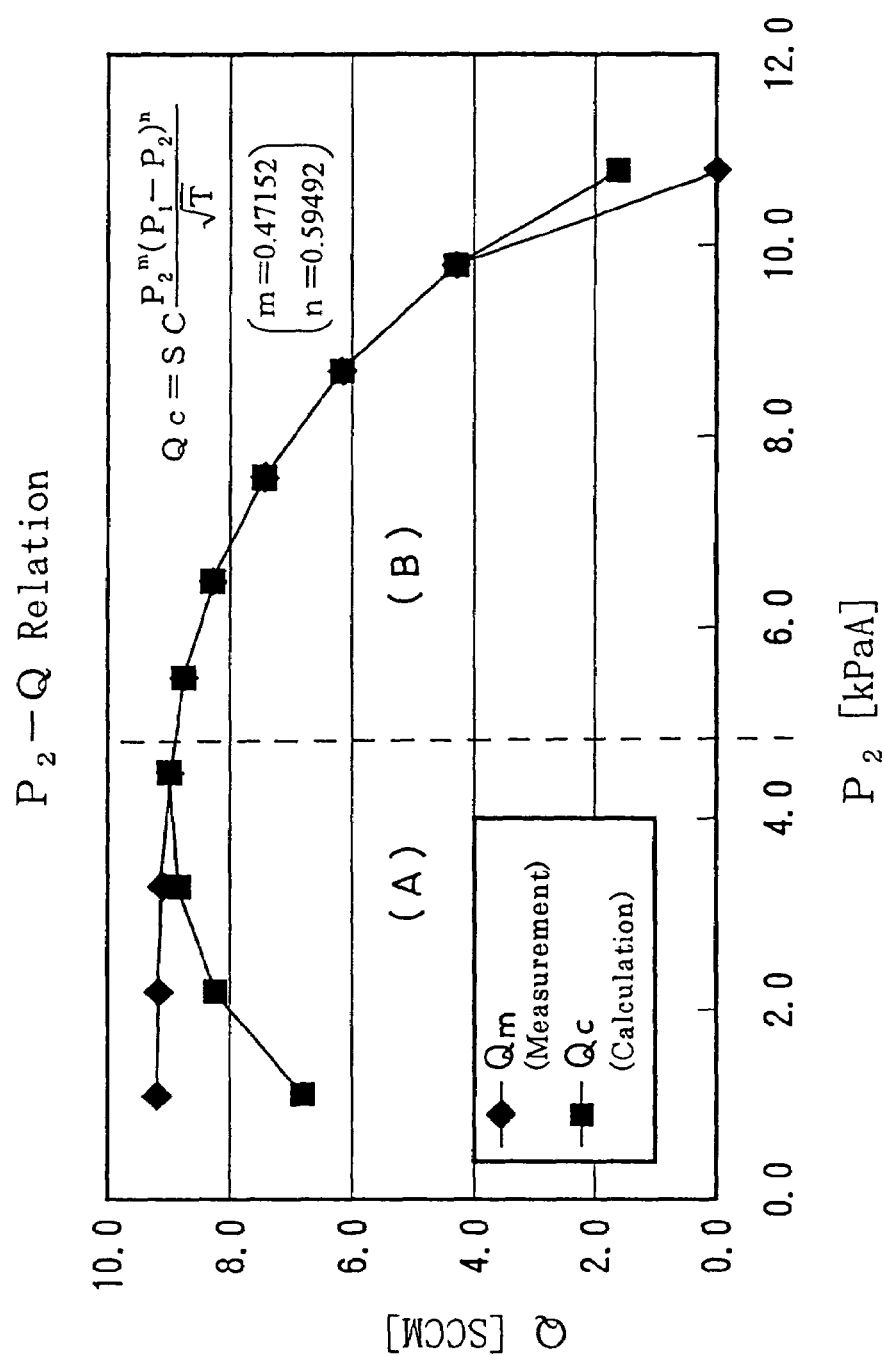
FIG. 1 is a diagram comparing a flow rate empirical formula with flow rate measured values under non-critical conditions.

REFERENCE NUMERALS 2 designates an improved pressure-type flow rate control apparatus; 3 an improved pressure-type flow rate control apparatus (NFCS); 4 an orifice; 4a an orifice hole; 6 an upstream pipe; 8 a downstream pipe; 10 an upstream pressure sensor; 12 a downstream pressure sensor; 14 a temperature sensor; 15a pressure ratio calculation means; 15b critical conditions judging means; 16 a control circuit; 17 flow rate calculation means; 17a critical flow rate calculation means; 17b non-critical flow rate calculation means; 18 flow rate setting means; 19 subtraction means; 20 a valve drive unit; 22 a control valve; 24 a gas tank; 26 a regulator; 27 a supply-side pipe; 28 a valve; 29 a control-side pipe; 30 a valve; 32 a chamber; 34 a drive pump; $P^1$ an upstream pressure; $P_2$ a downstream pressure; r a pressure ratio ($P_2/P_1$); $r_c$ a critical value; Q, a calculated flow rate; Qs a set flow rate; and $\Delta Q$ a flow rate difference.

DESCRIPTION OF THE PREFERRED EMBODIMENTS

FIG. 1 is a diagram comparing a flow rate empirical formula employed under non-critical conditions according to the present invention with measured flow rate values. The inventors examined a prior art theoretical flow rate formula that has been used under non-critical conditions. The prior art flow rate formula, which is derived from Bernoulli's theorem, is:

$$Qc = K(P_2(P_1-P_2))^{1/2}.$$

This may be re-written as:

$$Qc = KP_2^{1/2}(P_1-P_2)^{1/2}.$$

The prior art flow rate formula is an accurate formula when applied to an incompressible fluid. With a fluid such, for example, as an incompressible liquid the flow rate formula is applicable accurately enough. To adapt this flow rate formula to a compressible fluid such as gas, it is necessary to establish an empirical formula having a plurality of parameters without greatly changing the structure or form of the formula.

Accordingly, the inventors proposed the empirical formula:

$$Qc = KP_2^m(P_1-P_2)^n$$

and introduced two parameters, m and n, for the purpose of close fitting. Here, a proportional constant K is given by:

$$K = SC/T^{1/2},$$

and is worked out from the material conditions of gas flow and absolute temperature, T.

In FIG. 1, the abscissa axis represents the downstream side pressure $P_2$ in kPaA (kilopascal absolute pressure). The ordinate axis represents flow rate Q in SCCM, i.e. flow rate (cc/min.) under standard conditions. The vertical broken line at $P_2=4.8$ [kPaA] indicates the position of the critical value $r_c$, and the region (A) to the left of the line is a region under critical conditions, while the region (B) to the right of the line is a region under non-critical conditions.

In FIG. 1, the black rhombuses plotted are the measured values of flow rate. Parameters m, n are so determined that the above-mentioned empirical formula $Qc=KP_2^m(P_{-P2})^n$ yields values which are substantially equal to the measured values; it was found that m=0.47152 and n=0.59492.

The flow rates derived from the above-mentioned empirical formula are plotted with black squares. It is noted that the values provided by the flow rate empirical formula fit with and match with high precision the measured values in the whole region (B) of non-critical conditions. In critical region (A), too, the empirical formula fits with the measured values near the broken line. Since fitting or matching is effected with two free parameters m, n, a fitting area also appears in part of region (A) of critical conditions.

According to the study by the inventors, the values of the two parameters m, n depend on the range where the flow rate is to be controlled. The above-mentioned values m=0.47152 and n=0.59492 are applicable in the range where the flow rate is 0 to 10 sccm, but if the flow rate range is 0 to 100 or 0 to 1,000 sccm, then m and n will deviate from those values.

Studying the parameters m, n, which are variable for the purpose of fitting or matching according to the respective flow rate ranges, in terms of scattered value ranges, it is noted that 0.40<m<0.50 and 0.50<n<0.65. Hence, in an actual flow rate control situation, optimum values of the parameters m, n selected from within the above value ranges are used, depending on the range of flow rate to be controlled.

m=0.47152 and n=0.59492, as specified above, are merely examples selected from within the above-mentioned value ranges. However, it should be noted that the values m=0.5, n=0.5 obtained from Bernoulli's theorem are not within the above-mentioned value ranges. This means that the actual fluid is much different from an ideal fluid or non-compressible fluid. The present invention was made by discovering a flow rate empirical formula that holds good for and is applicable to the actual fluid.

Thus, if the equation $Qc=KP_2^m(P_1-P_2)^n$ (0.40<m<0.50, 0.50<n<0.65) is used in flow rate control under non-critical conditions, then flow rate control can be achieved with great precision. This formula can reproduce and match the actual measured values much better than the equation $Qc=K\ P_2^{1/2}(P_1-P_2)^{1/2}$ that is derived from Bernoulli's theorem. At the same time, it is possible to achieve flow rate control with high precision in the whole of the regions of non-critical and critical conditions by employing additionally the equation:

$$Qc = KP_1$$

as theoretical formula under critical conditions.

Figure 2:
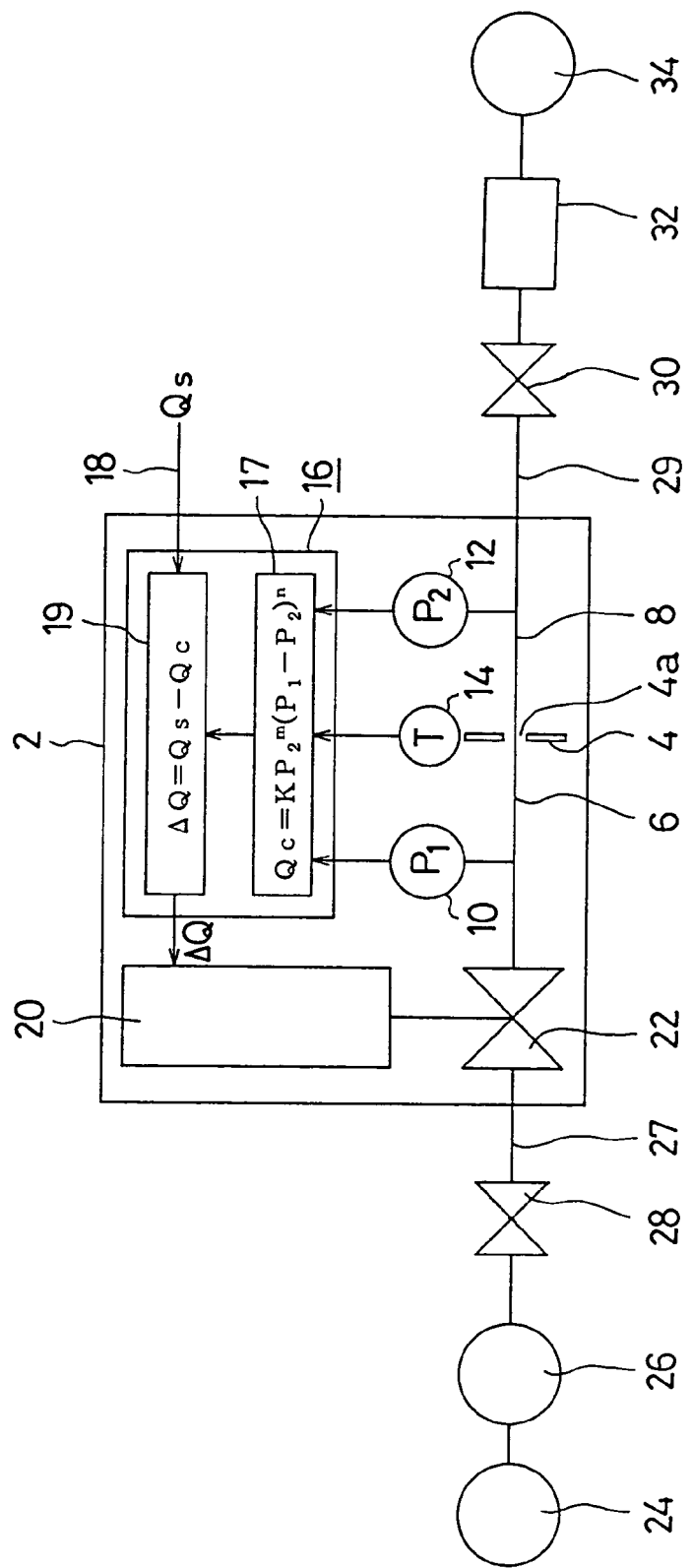
FIG. 2 is a constitutional diagram showing a first embodiment of an improved pressure-type flow rate control apparatus using an empirical flow rate formula according to the present invention.

FIG. 2 is an hypothetical example showing the operational state of a first embodiment of an improved pressure-type flow rate control apparatus in which the empirical formula of the present invention is employed. Said improved pressure-type flow rate control apparatus 2 is designed on the basis that the fluid is to be supplied under non-critical conditions, i.e. the velocity of the fluid flowing from an orifice 4 is less than sonic velocity.

Said improved pressure-type flow rate control apparatus 2 comprises said orifice 4 having an orifice hole 4a, an upstream pipe 6, a downstream pipe 8, an upstream pressure sensor 10, a downstream pressure sensor 12, a temperature sensor 14, a control circuit 16, a valve drive unit 20 and a control valve 22.

Said control circuit 16 primarily comprises a microcomputer and a built-in programme. Alternatively, an electronic circuit may be used, or an electronic circuit and a general purpose personal computer may be used. Said control circuit 16 comprises flow rate calculation means 17 for calculating the calculated flow rate Qc according to said empirical formula, flow rate setting means 18 for setting a set flow rate Qs of fluid to flow, and subtraction circuit 19 for determining a flow rate difference $\Delta Q (=Qs-Qc)$ between said calculated flow rate Qc and set flow rate Qs. Said flow rate difference $\Delta Q$ may be calculated from Qc−Qs.

On an upstream side of the improved pressure-type flow rate control apparatus 2 are connected a gas tank 24 containing high-pressure gas, a regulator 26 for adjusting the gas pressure of the high pressure gas to a proper level, and a valve 28 for supplying said gas from supply-side pipe 27 to a control valve 22.

On a downstream side of the improved pressure-type flow rate are connected a control-side pipe 29 for flowing gas at a regulated flow rate, a valve 30, a chamber 32, and a dry pump 34 to act as a vacuum pump.

Next, the control operation of the improved pressure-type flow rate control apparatus 2 is explained. On said upstream side, a gas under a specific pressure is supplied to said supply-side pipe 27, while on the downstream side, said control-side pipe 29 is set at a low pressure by the dry pump 34.

Gas is supplied to the upstream pipe 6 by the control valve 22, and the upstream pressure $P_1$ of this gas is measured by said upstream pressure sensor 10. At the same time, the downstream pressure $P_2$ of gas supplied from said orifice 4 to the downstream side is measured by said downstream pressure sensor 12. Also, the temperature of gas passing through said orifice 4 is measured by said temperature sensor 14.

In this embodiment, the velocity of the fluid flowing from the orifice hole 4a is set lower than sonic velocity by adjusting the exhaust rate of the dry pump 34 and thus non-critical conditions are always maintained. The pressure ratio $P_2/P_1$ is therefore not determined by said control circuit 16 and no comparison is made with the critical value $r_c$. Thus, in this embodiment, the flow rate of fluid is controlled on the basis that the fluid is always under non-critical conditions, i.e. $P_2/P_1 > r_c$ always holds good.

The upstream pressure $P_1$, downstream pressure $P_2$ and gas temperature T are inputted into said flow rate calculation means 17. In said flow rate calculation means 17, the proportional constant K is calculated from the gas temperature T, and $P_2{}^m(P_1-P_2)$ is determined from the two pressures $P_1$ and $P_2$, and finally the calculated flow rate Qc is determined in accordance with $Qc = KP_2{}^m(P_1-P_2)^n$. Said calculated flow rate Qc indicates the instantaneous flow rate of the fluid being supplied from orifice 4.

The target flow rate of the fluid to be supplied to the downstream side is inputted as said set flow rate Qs via said flow rate setting means 18. Said set flow rate Qs, and the above-mentioned calculated flow rate Qc are inputted into said subtraction circuit 19 and the flow rate difference $\Delta Q$ is obtained from $\Delta Q = Qs - Qc$. If the flow rate difference $\Delta Q$ is positive, then the flow rate is insufficient, and if the difference $\Delta Q$ is negative, then the flow rate is excessive.

A flow rate difference $\Delta Q$ signal is thus outputted to the valve drive unit 20, and the control valve 22 is so controlled as to bring the flow rate difference $\Delta Q$ to zero. Accordingly, adjustments are automatically made so that if the flow rate is insufficient ($\Delta Q>0$), then the patency of the control valve 22 is slightly increased, whilst if the flow rate ($\Delta Q<0$) is excessive, then the patency of control valve 22 is slightly reduced, thereby bringing $\Delta Q$ to zero.

The improved pressure-type flow rate control apparatus 2 has the advantage that the upstream pressure $P_1$ and downstream pressure $P_2$ are continuously measured. As a result, the opening and closing of control valve 22 can be constantly controlled at a high speed such that the flow rate can be controlled with high precision, at a high speed and automatically all at the same time.

The flow rate empirical formula $Qc = KP_2{}^m(P_1-P_2)^n$ which is the essential point of the present invention accurately expresses the flow rate of a fluid not only under non-critical conditions, but also under critical conditions in an area adjacent to the critical value, as explained above. The improved pressure-type flow rate control apparatus 2 can therefore be used for controlling fluid not only under non-critical conditions, but also in an area including both non-critical conditions and critical conditions.

Figure 3:
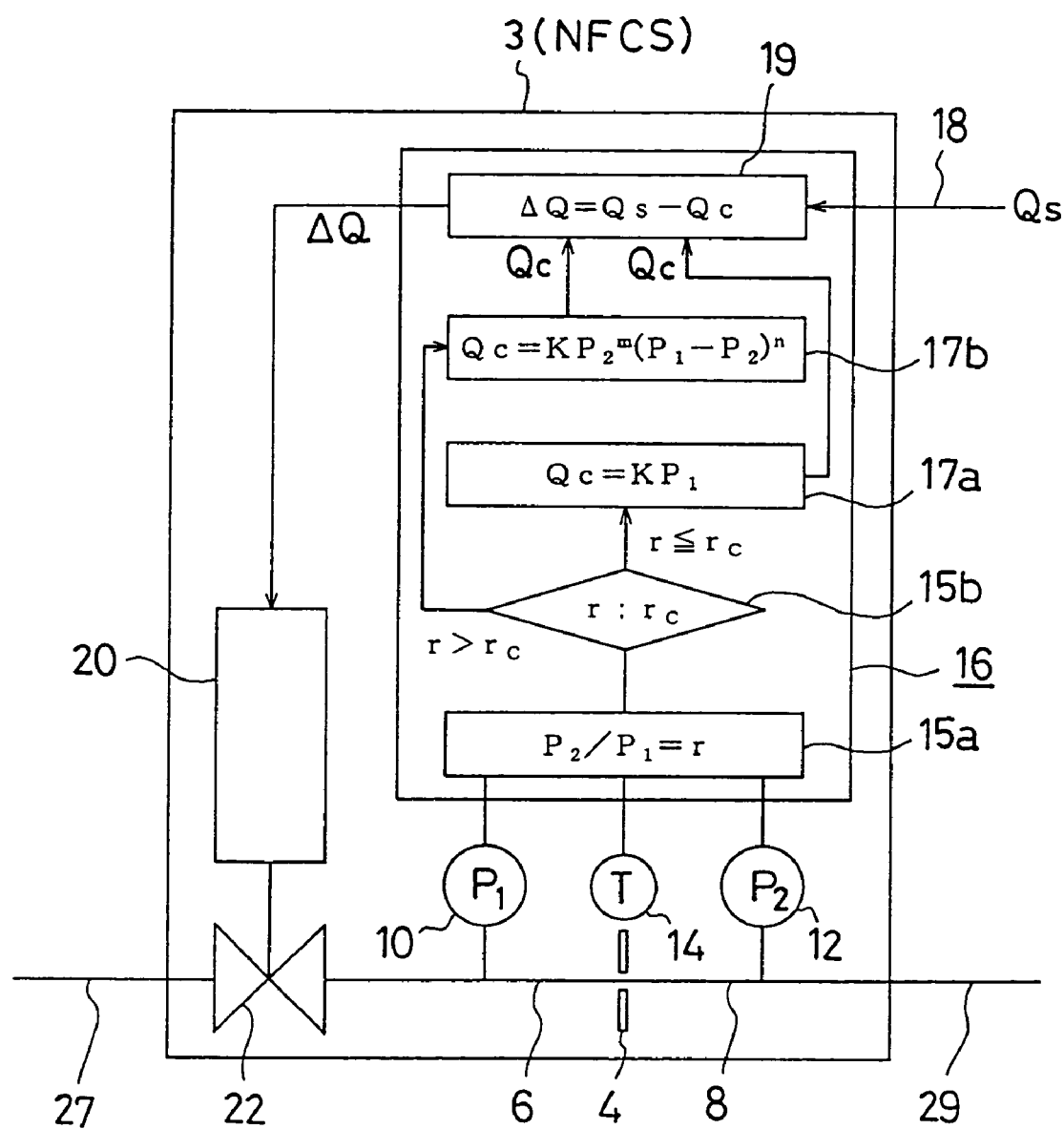
FIG. 3 is a constitutional diagram showing a second embodiment of an improved pressure-type flow rate control apparatus using an empirical flow rate formula according to the present invention.

FIG. 3 is a block diagram showing the operational state of a second embodiment of the pressure-type flow rate control apparatus using the empirical formula according to the present invention. Said second embodiment is different from the first embodiment merely in regard only to the internal arrangement of the control circuit 16 of the improved pressure-type flow rate control apparatus 3, and is identical to the first embodiment in all other respects. Only what is different are explained below, while the other parts (identical parts) are not repeated.

In the second embodiment, the pressure ratio $P_2/P_1$ is calculated from the upstream pressure $P_1$ and downstream side $P_2$, and it is continuously determined whether the fluid is under critical or non-critical conditions. The flow rate is controlled under critical conditions using:

$$Qc = KP_1$$

while the flow rate is controlled under non-critical conditions using flow rate:

$$Qc = KP_2{}^m(P_1-P_2)^n$$

such that the flow rate is controlled in the strictest way possible at any given moment.

The improved pressure-type flow rate control apparatus 3 of the second embodiment is the best mode and is therefore named NFCS (New Flow Control System). Said control circuit 16 comprises pressure ratio calculation means 15a, critical conditions judging means 15b, critical flow rate calculating means 17a, non-critical flow rate calculating means 17b, flow rate setting means 18 and a subtraction circuit 19.

If the upstream pressure $P_1$ and downstream pressure $P_2$ are inputted, then the pressure ratio calculation means 15a calculates the pressure ratio $P_2/P_1$, and its value r is memorized. Said value r is inputted to said critical conditions judging means 15b and is compared with a critical value $r_c$.

As mentioned earlier, said critical value $r_c$ is given by:

$$(2/(n+1))^{n/(n-1)}.$$

In two-atom molecular gas, $r_c=0.53$; in non-linear three atom molecular gas, $r_c=0.54$; and it can be expressed as $r_c=$about 0.5.

If $r>r_c$, then the fluid is under non-critical conditions and the calculated flow rate Qc is calculated from:

$$Qc=KP_2^m(P_1-P_2)^n$$

by said non-critical flow rate calculating means 17b.

If $r<r_c$, then the fluid is under critical conditions, and the calculated flow rate Qc is calculated from:

$$Qc=KP_1$$

by said critical flow rate calculating means 17a.

In this manner, it is constantly checked whether the fluid is under critical or non-critical conditions, thereby making it possible to estimate the actual flow rate by a proper flow rate formula.

Finally, the flow rate difference $\Delta Q$ between said set flow rate Qs and said calculated flow rate Qc is determined by said subtraction circuit 19, and the valve drive unit 20 is actuated to control (close or open) the control valve 22 to bring flow rate difference $\Delta Q$ to zero.

Figure 4:
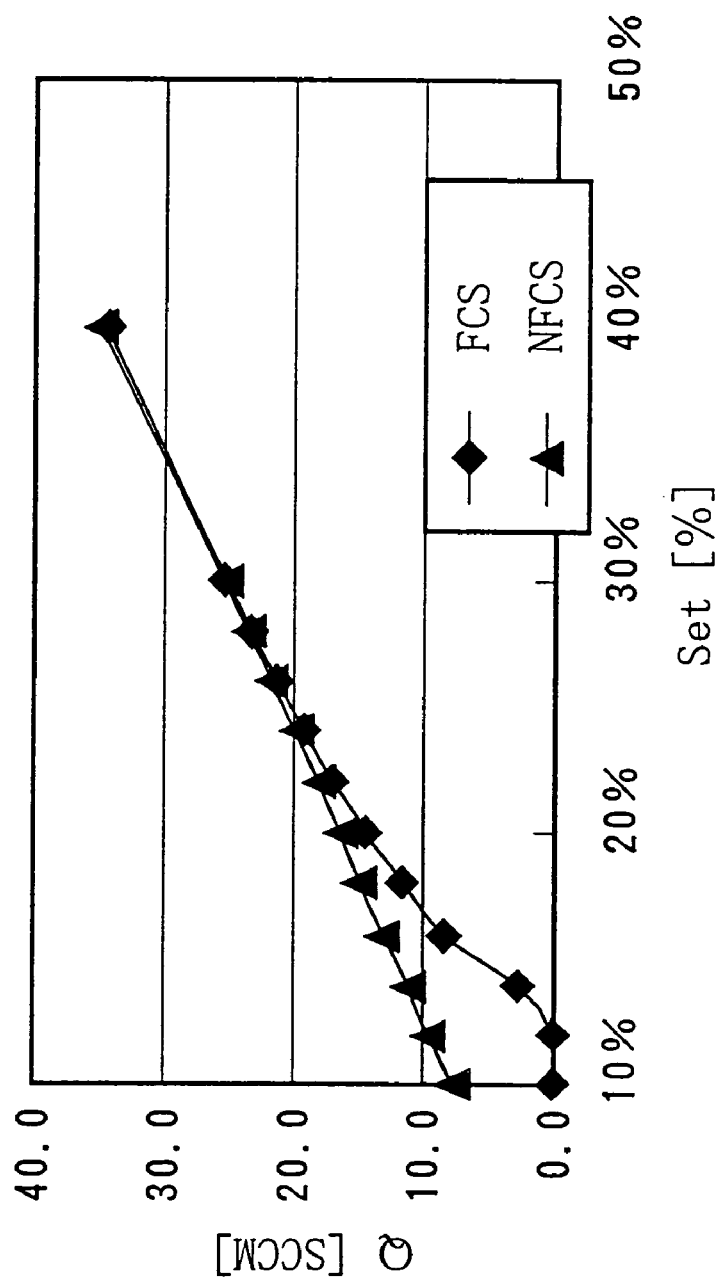
FIG. 4 is a diagram which compares flow rates corresponding to different control flow rate formulae.
Figure 5:
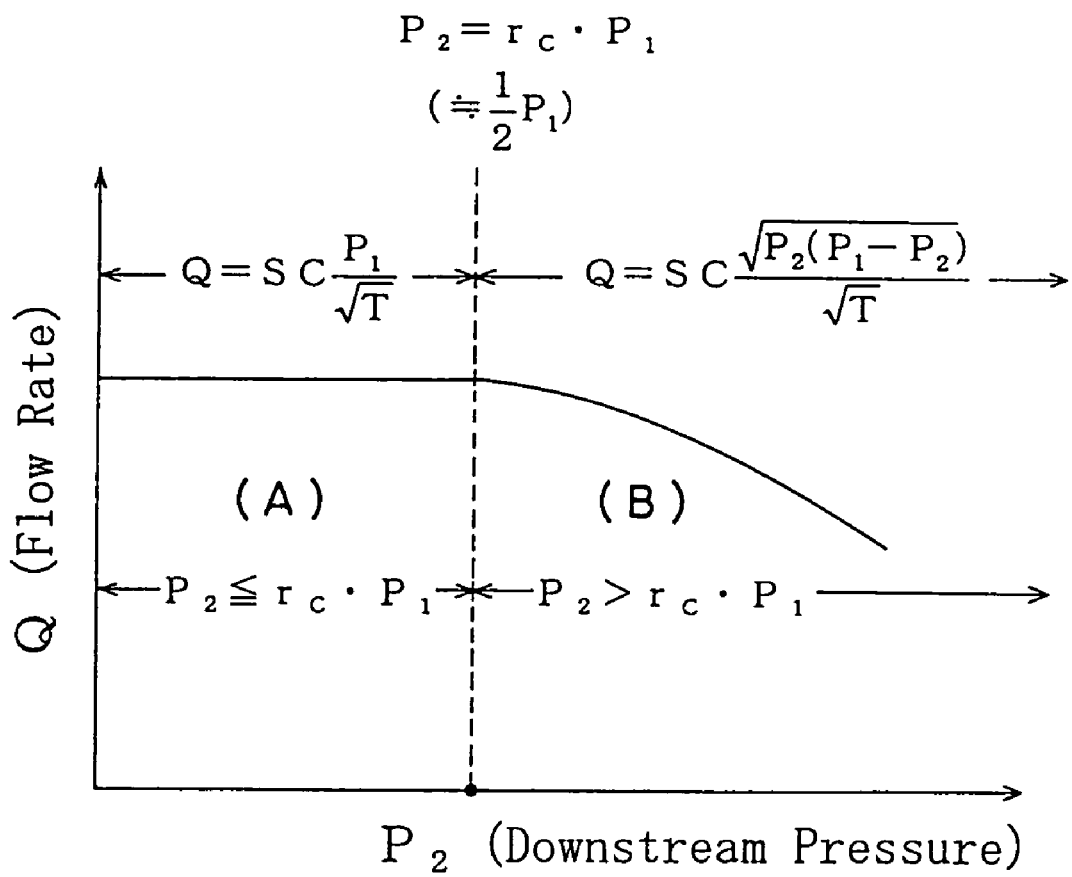
FIG. 5 is an explanatory diagram of the theoretical formula that has been used hitherto.

FIG. 4 compares results from different flow rate control formulae. A plotted line with black rhombuses shows results obtained when $Q=KP_1$, the flow rate formula intended for and applicable to fluid under critical conditions, was applied to all of the regions (under critical conditions and non-critical conditions). This formula is equivalent to the prior art FCS (Flow Control System). The other plotted line, with black triangles, shows the results obtained with the NFCS (New Flow Control System).

With a maximum flow rate of 80 [SCCM], the system is so prearranged that when the flow rate reaches 100% of the set flow rate, the flow rate will be 80 [SCCM]. It is considered therefore that the greater the flow rate, the better the critical conditions (sonic region) are satisfied. As the flow rate decreases, the fluid moves into non-critical conditions (sub-sonic region).

In the prior art FCS (the line with black rhombuses), the fluid is controlled in all the regions using the flow rate formula $Q=KP_1$ only. As a result, when the set flow rate is great, the critical conditions are satisfied and the correct flow rate is indicated. However, when the set flow rate is small, the fluid is under non-critical conditions. Accordingly, the flow rate formula applicable to critical conditions fails to reflect the flow rate accurately. Hence, it is possible that even if the set flow rate is 10%, wrong results will come out; for example, flow rate=0. At low flow rates, therefore, an additional mechanism to correct the prior art FCS was needed.

In NFCS, however, $Qc=KP_1$, flow rate formula applicable under critical conditions, is employed under critical conditions; and under non-critical conditions, $Qc=KP_2^m(P_1-P_2)^n$, the empirical formula for non-critical conditions, is used. Therefore, a correct flow rate Q, proportional to the set flow rate, is calculated and linearity with respect to set percentage of flow rate Q is assured, as shown by the plotted line with black triangles in FIG. 4.

Needless to say, the present invention is not restricted to the above-mentioned embodiments. It is to be understood that changes and variations may be made without departing from the spirit or scope of the present invention.

EFFECTS OF THE INVENTION

According to the invention of the first embodiment, a flow rate Qc of fluid passing through an orifice, that is, the actual flow rate, is calculated by:

$$Qc=KP_2^m(P_1-P_2)^n,$$

the empirical formula that accurately reproduces the actual flow rate of fluid. As a result, an improved pressure-type flow rate control apparatus that can control flow rate with high precision can be materialized.

According to the invention of the second embodiment, a calculated flow rate Qc is calculated by:

$$Qc=KP_2^m(P_1-P_2)^n$$

and is compared with a set flow rate Qs, and a control valve is so controlled to bring a flow rate difference $\Delta Q$ ($=Qs-Qc$ or $Qc-Qs$) to zero. An improved pressure-type flow rate control apparatus that can control and set the flow rate of a fluid accurately and at a high speed can therefore be materialized.

According to the invention of the third embodiment, when a fluid flowing out of the orifice is under non-critical conditions, the improved pressure-type flow rate control apparatus of the second embodiment can be actuated, and therefore a highly accurate, improved pressure-type flow rate control apparatus can be provided.

According to the invention of the fourth embodiment, the flow rate is so controlled that when fluid flowing from the orifice is under critical conditions, the flow rate formula applicable under critical conditions:

flow rate $Qc=KP_2^m(P_1-P_2)^n$ is employed to control flow rate. Even if the fluid changes from critical conditions to non-critical conditions, therefore, this change will be followed at high speed and the flow rate of the fluid can be controlled with great precision.

According to the invention of the fifth embodiment, it is possible to judge accurately whether a fluid is under critical conditions or non-critical conditions by merely measuring the upstream side pressure $P_1$ and the downstream side pressure $P_2$. Thus, all kinds of fluid can be controlled.

What is claimed is:

1. A pressure-type flow rate control apparatus comprising:
   a pipe having a supply-side portion and a control-side portion;
   an orifice provided between the supply-side portion and the control-side portion of the pipe;
   a fluid flow rate calculation means for calculating a fluid flow rate Qc by $$Qc=KP_2^m(P_1-P_2)^n,$$

wherein K is a proportional constant; and m and n are constants having values of $0.40<m<0.50$ and $0.50<n<0.65$, respectively;
   $P_1$ is pressure upstream of the orifice and $P_2$ is pressure downstream of the orifice;
   an upstream pressure sensor provided on the supply-side portion of the pipe and between a control valve and the orifice, wherein the upstream pressure sensor is disposed to detect the pressure upstream $P_1$ and to send input to the fluid flow rate calculation means; and
   a downstream pressure sensor provided on the control-side portion of the pipe, wherein the downstream pressure sensor is disposed to detect the pressure downstream $P_2$ and to send input to the fluid flow rate calculation means; wherein the fluid flow rate calculation means is connected to send input used for controlling the control valve so as to adjust the actual flow rate of fluid passing through the orifice.

2. A pressure-type flow rate control apparatus comprising:

a pipe having an orifice for control of flow rate;

a control valve provided on the pipe on an upstream side of the orifice;

an upstream pressure sensor provided between the orifice and the control valve to detect an upstream pressure $P_1$ and to send input to a flow rate calculation means;

a downstream pressure sensor provided on a downstream pipe on a downstream side of the orifice to detect a downstream pressure $P_2$ and to send input to the flow rate calculation means;

the flow rate calculation means for calculating a calculated flow rate Qc by $$Qc=KP_2^m(P_1-P_2)^n,$$

wherein K is a proportional constant; and m and n are constants having values of 0.40<m<0.5 and 0.50<n<0.65, respectively, and upstream side pressure $P_1$ detected by the upstream pressure sensor is input from the upstream pressure sensor and downstream side pressure $P_2$ is input from the downstream pressure sensor;

flow rate setting means for setting a set flow rate Qs for fluid to be supplied on the downstream side;

subtraction means for determining a flow rate difference ΔQ between the set flow rate Qs and the calculated flow rate Qc, wherein the flow rate setting means is connected to input the set flow rate Qs to the subtraction means and the flow rate calculation means is connected to input the calculated flow rate Qc to the subtraction means; and a drive unit connected to control opening and closing of the control valve to bring flow rate difference ΔQ to zero so the flow rate of fluid supplied to the downstream pipe is controlled to the set flow rate Qs.

3. A pressure-type flow rate control apparatus according to claim 2, which is permitted to operate under non-critical conditions where the velocity of the fluid flowing out from said orifice is lower than the sonic velocity.

4. A pressure-type flow rate control apparatus according to claim 3, wherein a critical pressure ratio $r_c$ is determined by:

$$r_c=(2/n'+1)^{n'/(n'-1)},$$

wherein n' is the specific heat ratio of fluid molecule defined by Cp/Cv, wherein Cp is the specific heat capacity of the fluid at constant pressure and Cv is the specific heat capacity of the fluid at constant volume, and wherein when the pressure ratio $P_2/P_1$ is not higher than said critical pressure ratio $r_c$, the fluid is judged to be under critical conditions, and when the pressure ratio $P_2/P_1$ is higher than said critical pressure ratio $r_c$, the fluid is judged to be under non-critical conditions.

5. A pressure-type flow rate control apparatus comprising:

a pipe having an orifice for controlling flow rate;

a control valve provided on the pipe on an upstream side of the orifice;

an upstream pressure sensor provided between the orifice and the control valve for measuring an upstream pressure $P_1$ and connected to send input to a critical conditions judging means;

a downstream pressure sensor provided on a downstream pipe on a downstream side of the orifice for measuring a downstream pressure $P_2$ and connected to send input to the critical conditions judging means;

the critical conditions judging means for judging, on the basis of a pressure ratio between the upstream pressure $P_1$ and the downstream pressure $P_2$, whether fluid flowing from the orifice is under critical conditions in a sonic region or not;

a non-critical flow rate calculating means for calculating under non-critical conditions a calculated flow rate Qc by $$Qc=KP_2^m(P_1-P_2)^n,$$

wherein K is a proportional constant; and m and n are constants having values of 0.40<m<0.5 and 0.50<n<0.65, respectively, wherein the non-critical flow rate calculating means is connected to receive input from the critical conditions judging means regarding the pressure ratio between the upstream pressure $P_1$ and the downstream pressure $P_2$;

critical flow rate calculating means for calculating under critical conditions said calculated flow rate Qc by $$Qc=KP_1,$$

wherein K is the=proportional constant and the critical flow rate calculating means is connected to receive input from the critical conditions judging means regarding the pressure ratio between the upstream pressure $P_1$ and the downstream pressure $P_2$;

flow rate setting means for setting a set flow rate Qs for fluid to be supplied on the downstream side;

subtraction means for determining a flow rate difference ΔQ between the set flow rate Qs and the calculated flow rate Qc, wherein the flow rate setting means is connected to input the set flow rate Qs to the subtraction means and the non-critical flow rate calculation means and the critical flow rate calculation means are each connected to input calculated flow rate Qc to the subtraction means; and a drive unit connected to control the control valve so as to bring the flow rate difference ΔQ to zero so the flow rate of fluid supplied to the downstream pipe is adjusted to the set flow rate Qs.

6. A pressure-type flow rate control apparatus according to claim 5, wherein a critical pressure ratio $r_c$ is determined by:

$$r_c=(2/n'+1)^{n'/(n'-1)}$$

wherein n' is the specific heat ratio of fluid molecule defined by Cp/Cv, wherein Cp is the specific heat capacity of the fluid at constant pressure and Cv is the specific heat capacity of the fluid at constant volume, and wherein when the pressure ratio $P_2/P_1$ is not higher than said critical pressure ratio $r_c$, the fluid is judged to be under critical conditions, and when the pressure ratio $P_2/P_1$ is higher than said critical pressure ratio $r_c$, the fluid is judged to be under non-critical conditions.

* * * * *